Feb. 11, 1941.  H. BROOKS  2,231,701

HIGH-VOLTAGE CAPACITOR

Filed March 25, 1938   2 Sheets-Sheet 1

WITNESSES:
E. F. Oberheim.
F. P. Lyle

INVENTOR
Hamilton Brooks.
BY O. B. Buchanan
ATTORNEY

Feb. 11, 1941.  H. BROOKS  2,231,701

HIGH-VOLTAGE CAPACITOR

Filed March 25, 1938  2 Sheets-Sheet 2

WITNESSES:
E. F. Oberheim
F. P. Lyle

INVENTOR
*Hamilton Brooks.*
BY O. B. Buchanan
ATTORNEY

Patented Feb. 11, 1941

2,231,701

UNITED STATES PATENT OFFICE 2,231,701

HIGH-VOLTAGE CAPACITOR

Hamilton Brooks, Wilkinsburg, Pa., assignor to Westinghouse Electric & Manufacturing Company, East Pittsburgh, Pa., a corporation of Pennsylvania Application March 25, 1938, Serial No. 198,081

3 Claims. (Cl. 175—41)

The present invention relates to power capacitors and, more particularly, to capacitors intended for use on high-voltage transmission or distribution lines.

Capacitors, either singly or in banks, are often connected to transmission or distribution lines to improve the power factor, or for other purposes. Their use for this purpose, however, has been confined chiefly to lines of moderate voltage, that is, not over 6000 or 7000 volts. This is mainly because of the difficulty of designing satisfactory capacitors which can be operated with safety and reliability on higher voltages. Obviously, the advantages of improving the power factor of higher voltage lines are equally great and, accordingly, considerable demand exists for suitable capacitors for this service.

The object of the present invention, therefore, is to provide a capacitor which can be used on high-voltage lines with safety and reliability.

The chief problem in the design of a high-voltage capacitor results from the voltage stress between the capacitor foils and the metal case. With these elements separated only by insulation, the full voltage applied to the capacitor exists between the case and the foils, and the voltage stress becomes concentrated at the foil edges. Such capacitors are usually filled with oil or other liquid insulating medium and this concentrated voltage stress becomes high enough to result in deterioration and eventual breakdown of the oil or other insulating liquid at these points, causing failure of the capacitor. This difficulty is avoided in the capacitor of the present invention by providing metal shielding means between the capacitor foils and the metal case, which divides the voltage and controls its distribution between the foils and the case so as to reduce the voltage stresses to a safe value and thus avoid the danger of breakdown of the liquid insulating medium.

The invention will be more fully understood from the following detailed description taken in connection with the accompanying drawings, in which.

Figure 1:
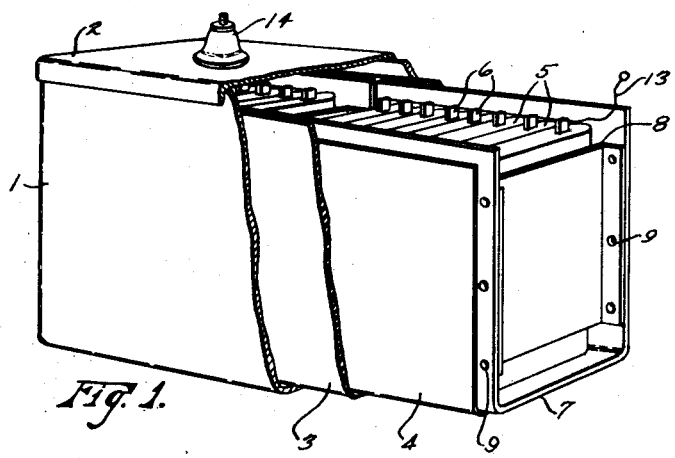
Figure 1 is a perspective view of a capacitor, partly broken away to show the construction.

The capacitor shown in Fig. 1 comprises a sheet metal case 1 having a suitable cover 2, which is welded or otherwise permanently joined to the case after assembly of the capacitor. An insulating liner 3 is provided in the form of a channel member made of pressboard or other insulating material and fitted inside the case 1. A metal shielding member 4 is placed inside the liner. This member is preferably also in the form of a channel fitting closely inside the liner, but of somewhat less length and height so as to provide a substantial creepage distance between the shield and the case. The capacitor sections or windings 5 may be of the usual construction, consisting of alternate layers of metal foil and paper, which are rolled together and compressed and provided with suitable terminals 6. These sections may, if desired, be impregnated with a suitable insulating compound in the usual manner.

Figure 2:
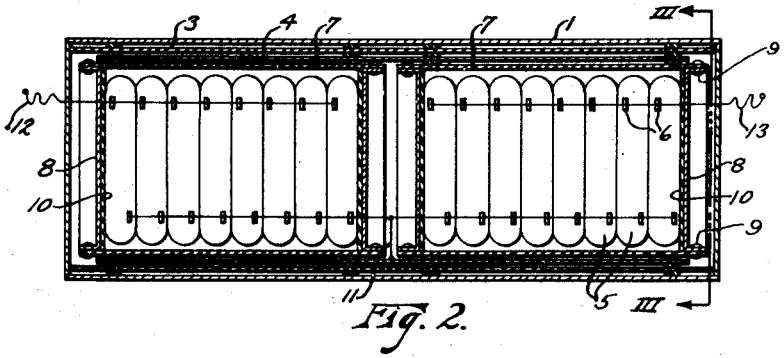
Fig. 2 is a plan view of the capacitor with the case shown in section.

As shown in Fig. 2, the capacitor sections are assembled in two groups. The sections of each group are placed in a channel member 7 of pressboard or other suitable insulating material of sufficient rigidity and strength, and are held in position therein under pressure by metal clamp plates 8, which are secured in the ends of the channel 7 by rivets 9 and separated from the capacitor sections by insulating spacers 10. The two groups of capacitor sections are placed inside the metal shield 4 in end-to-end relation, and are connected together in series, as shown in Fig. 2. The shield 4 is electrically connected to the capacitor sections between the two groups by a connection 11, and the leads 12 and 13 at opposite ends of the capacitor groups are brought out through bushings in the top of the case to suitable terminals 14. The case is filled with a liquid insulating medium after the capacitor has been completely assembled.

Figure 4:
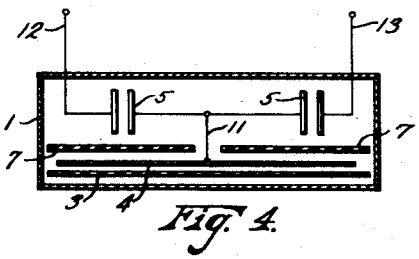
Fig. 4 is a diagram illustrating the arrangement of the shielding means.

The effect of this arrangement will be more clearly seen from Fig. 4, which is a diagrammatic representation of the arrangement just described. It will be seen from this figure that the connection of the shield to the capacitor sections between the two groups maintains it at a higher potential than that of the case, which is usually at ground or zero potential, and that the voltage between the capacitor sections and the shield is only one-half the voltage applied to the capacitor. Furthermore, since all points in the shield must have the same potential, the concentration of voltage stresses at the foil edges is eliminated, or at least greatly reduced. It will be seen, therefore, that the effect of the shield when connected in this manner is to reduce the voltage between the capacitor foils and the nearest points of different potential, thus decreasing the voltage stress on the liquid dielectric and avoiding the danger of deterioration and eventual breakdown.

Figure 3:
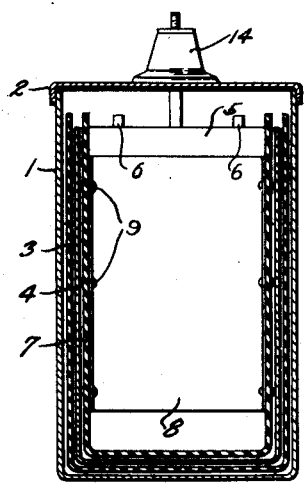
Fig. 3 is an end sectional view approximately on the line III—III of Fig. 2.
Figure 5:
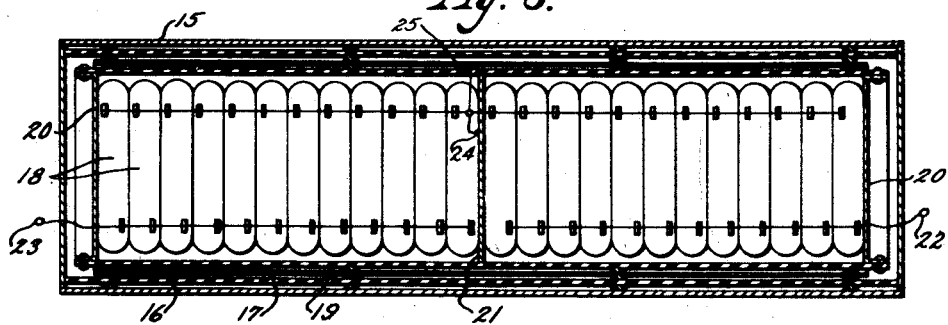
Fig. 5 is a plan view corresponding to Fig. 2, but showing an alternative arrangement.

Fig. 5 shows a possible alternative arrangement, in which the capacitor sections are assembled in a single group. In this figure, the case is indicated at 15, the insulating liner at 16, and the shield at 17. These elements may be identical with those described above. The capacitor sections 18 are assembled in a single group, which is similar in construction to the separate groups shown in Figs. 1 to 3 and consists of a pressboard channel 19 in which the capacitor sections are clamped by metal plates 20. The capacitor sections are divided into two groups by a metal plate 21 in the center of the assembly, and the two groups thus formed are connected together in series with the leads 22 and 23 carried to suitable terminals on the case. The metal plate 21 is connected between the two groups, as shown at 24, and the plate itself is connected to the shield at 25. The effect of this arrangement in reducing and controlling the voltage stress is, of course, the same as in the form of the invention described above but it has the advantage of requiring only a single assembly of capacitor sections.

Figure 6:
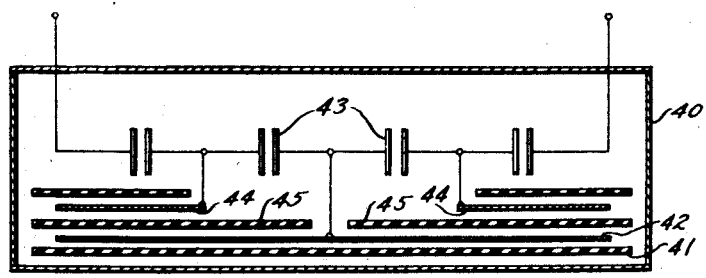
Fig. 6 is a diagrammatic view similar to Fig. 4 showing a further modification of the invention.

The embodiments of the invention described above are suitable for voltages of the order of 12,000 to 14,000 volts. For higher voltages, it may be desirable or necessary in some cases to further sub-divide the voltage between the capacitor foils and the case, and this may be done as indicated diagrammatically in Fig. 6. The general arrangement of this capacitor unit and its mechanical construction are preferably similar to that shown either in Figs. 1 to 3 or in Fig. 5. The case 40 is provided with an insulating liner 41 and a metallic shield 42, placed inside the liner. In this case, however, the capacitor sections are assembled in four separate groups, shown diagrammatically at 43, each of which may be similar to the group assemblies shown in Fig. 2, placed end-to-end in the case and connected together in series, or the groups of capacitor sections may be separated by metal plates as shown in Fig. 5. In order to reduce the voltage stress, additional metal shielding members 44 are provided, which may be similar in shape to the shields previously described, but of a length approximately equal to that of one of the groups of capacitor sections. These shields are placed inside the shield 42 opposite the outer groups of sections, and insulated by channel-shaped insulating members 45. The shield 42 is connected to the capacitor sections between the two center groups while each of the shields 44 is connected between one of the outer groups and the adjacent inner group. The effect of this arrangement is to divide the voltage into two steps, and it will be seen that only one-fourth of the applied voltage exists between each capacitor section and the nearest point of lower potential. This arrangement will be satisfactory for fairly high voltages, but it should be obvious that, if desired, the voltage could be still further divided in the same manner to make the capacitor suitable for use on the highest voltages.

It will, of course, be understood that the invention is capable of various modifications and embodiments. Thus, in some cases, it may be desirable to increase the shielding effect by enclosing the capacitor sections on all sides, and this may be done by extending the shields so that they are closed at the ends and providing them with covers through which the leads may be carried in insulating bushings, thus forming a metal box completely surrounding the capacitor sections within the case. In other cases, less shielding may be required, and it may be satisfactory to provide shields only at the points where the concentration of voltage stress may become the greatest, that is, opposite the foil edges. In this case, sufficient shielding may be provided merely by using a metal plate on which the capacitor sections rest and which is connected between the groups of sections.

It will be seen, therefore, that a relatively simple, but very effective, construction has been provided for reducing the voltage stress between the capacitor foils and the metal case and for controlling the distribution of this voltage. It is to be understood that many modifications and embodiments of this invention are possible, and that, although certain specific constructions have been illustrated and described, the invention is not limited to them, but in its broadest aspects it includes all equivalent embodiments and modifications which come within the scope of the appended claims.

I claim as my invention:

1. A capacitor comprising a metal case, an insulating liner in the case, a plurality of capacitor sections disposed in four groups in end-to-end relation in the case, the sections of each group being connected together and the groups being connected in series, a metal shielding member inside the liner extending substantially coextensive with the capacitor sections and connected to them between the center groups, other shielding members inside the first-mentioned shielding member and insulated therefrom, said members being substantially coextensive with the end groups of capacitor sections and connected between them and the center groups.

2. A capacitor comprising a metal case, a plurality of capacitor sections disposed in a plurality of groups in the case, the sections of each group being connected together and the groups being connected in series, a metal shielding member between the case and the capacitor sections and insulated from the case, said shielding member extending for substantially the entire length of the case and being electrically connected to the midpoint of said plurality of series-connected groups of capacitor sections, and additional metal shielding members placed between the capacitor sections and said first mentioned shielding member and insulated therefrom, each of said last mentioned shielding members being coextensive with one of said groups of capacitor sections and electrically connected between that group and the adjacent group.

3. A capacitor comprising a metal case, an insulating liner in the case, a plurality of capacitor sections disposed in a plurality of groups in the case, the sections of each group being connected together and the groups being connected in series, a generally channel-shaped metal shielding member fitting inside the insulating liner, said shielding member extending for substantially the entire length of the case and being electrically connected to the midpoint of said plurality of series-connected groups of capacitor sections, and additional channel-shaped metal shielding members placed inside said first mentioned shielding member and insulated therefrom, each of said last mentioned shielding members being coextensive with one of said groups of capacitor sections and electrically connected between that group and the adjacent group.

HAMILTON BROOKS.